United States Patent
Hoshi et al.

(10) Patent No.: US 12,334,497 B2
(45) Date of Patent: Jun. 17, 2025

(54) SOLID ELECTROLYTE, AND ELECTRODE MIXTURE, SOLID ELECTROLYTE LAYER AND SOLID-STATE BATTERY, EACH USING SAME

(71) Applicant: Mitsui Mining & Smelting Co., Ltd., Tokyo (JP)

(72) Inventors: Yuji Hoshi, Ageo (JP); Hideaki Matsushima, Ageo (JP); Teruaki Yagi, Ageo (JP)

(73) Assignee: MITSUI MINING & SMELTING CO., LTD. (JP)

(*) Notice: Subject to any disclaimer, the term of this patent is extended or adjusted under 35 U.S.C. 154(b) by 528 days.

(21) Appl. No.: 17/765,492

(22) PCT Filed: Oct. 20, 2020

(86) PCT No.: PCT/JP2020/039374
§ 371 (c)(1),
(2) Date: Mar. 31, 2022

(87) PCT Pub. No.: WO2021/085239
PCT Pub. Date: May 6, 2021

(65) Prior Publication Data
US 2022/0416292 A1 Dec. 29, 2022

(30) Foreign Application Priority Data
Oct. 29, 2019 (JP) .................. 2019-196780

(51) Int. Cl.
*H01M 10/05* (2010.01)
*H01M 10/0525* (2010.01)
*H01M 10/0562* (2010.01)

(52) U.S. Cl.
CPC ... *H01M 10/0562* (2013.01); *H01M 10/0525* (2013.01); *H01M 2300/008* (2013.01)

(58) Field of Classification Search
CPC ............ H01M 10/0562; H01M 2300/008
See application file for complete search history.

(56) References Cited

U.S. PATENT DOCUMENTS

| | | |
|---|---|---|
| 2016/0156064 A1 | 6/2016 | Miyashita et al. |
| 2016/0293946 A1 | 10/2016 | Ritter et al. |
| 2017/0222257 A1 | 8/2017 | Miyashita et al. |
| 2018/0358653 A1* | 12/2018 | Maruyama ........ H01M 10/0525 |
| 2019/0319305 A1 | 10/2019 | Utsuno et al. |
| 2020/0227776 A1 | 7/2020 | Jordy et al. |
| 2022/0367907 A1 | 11/2022 | Utsuno et al. |

FOREIGN PATENT DOCUMENTS

| | | |
|---|---|---|
| JP | 2016-134316 A | 7/2016 |
| JP | 2016-534493 A | 11/2016 |
| JP | 2018-29058 A | 2/2018 |
| KR | 20190082794 A | 7/2019 |
| WO | 2019-057840 A1 | 3/2019 |

OTHER PUBLICATIONS

Parvie Adeli, et al. "Boosting Solid-State Diffusivity and Conductivity in Lithium Superionic Argyrodites by Halide Substitution"; Angewandte Chem. International Edition; Year 2019; pp. 8681-8686 (total 6 pages).

International Search Report (in English and Japanese) issued in PCT/JP2020/039374, mailed Dec. 28, 2020; ISA/JP (5 pages).

* cited by examiner

*Primary Examiner* — Maria Laios
*Assistant Examiner* — Ziheng Lu
(74) *Attorney, Agent, or Firm* — Harness, Dickey & Pierce, P.L.C.

(57) ABSTRACT

A solid electrolyte contains a compound that has a crystal phase having an argyrodite-type crystal structure and that is represented by $Li_aPS_bX_c$, where X is at least one elemental halogen, a represents a number of 3.0 or more and 6.0 or less, b represents a number of 3.5 or more and 4.8 or less, and c represents a number of 0.1 or more and 3.0 or less. The proportion of the crystal phase with an argyrodite-type structure relative to all crystal phases constituting the solid electrolyte is 97.0 wt % or more. The compound has a lattice strain of less than 0.10%. The solid electrolyte preferably exhibits a lithium ion conductivity of 4.0 mS/cm or more.

5 Claims, No Drawings

SOLID ELECTROLYTE, AND ELECTRODE MIXTURE, SOLID ELECTROLYTE LAYER AND SOLID-STATE BATTERY, EACH USING SAME

CROSS REFERENCE TO RELATED APPLICATIONS

This application is a U.S. National Phase application under 35 U.S.C. 371 of International Application No. PCT/JP2020/039374, filed on Oct. 20, 2020, which claims priority to Japanese Patent Application No. 2019-196780, filed on Oct. 29, 2019. The entire disclosures of the above applications are expressly incorporated by reference herein.

BACKGROUND

Technical Field

The present invention relates to a solid electrolyte, and an electrode material mixture, a solid electrolyte layer and a solid-state battery containing the same.

Related Art

In recent years, a solid electrolyte has attracted attention since it can replace a liquid electrolyte used in most liquid batteries. A solid-state battery, which contains such a solid electrolyte, is expected to be put to practical use since it is safer than a liquid battery containing a flammable organic solvent and also has a high energy density.

As conventional techniques for solid electrolytes, the techniques disclosed in US 2016/156064A1 and US 2017/222257A1 are known, for example. US 2016/156064A1 discloses a sulfide solid electrolyte that is represented by the compositional formula: $Li_{7-x}PS_{6-x}Ha_x$, where Ha represents Cl or Br, and has a cubic crystal structure belonging to the F-43m space group. US 2017/222257A1 discloses a sulfide solid electrolyte containing a compound that has an argyrodite-type crystal structure and is represented by $Li_{7-x-2y}PS_{6-x-y}Cl_x$.

High lithium ion conductivity is one of the characteristics required of solid electrolytes. For example, a possible approach to an increase in the lithium ion conductivity may be to control the argyrodite rate to a high value in the techniques disclosed in US 2016/156064A1 and US 2017/222257A1 described above. However, none of US 2016/156064A1 and US 2017/222257A1 discloses a specific method for increasing the argyrodite rate. Also, none of US 2016/156064A1 and US 2017/222257A1 contains a particular disclosure about other factors for increasing the lithium ion conductivity. Accordingly, it is an object of the present invention to provide a solid electrolyte with a high lithium ion conductivity.

SUMMARY

The present invention provides a solid electrolyte including: a compound that has a crystal phase having an argyrodite-type crystal structure and that is represented by $Li_aPS_bX_c$, where X is at least one elemental halogen, a represents a number of 3.0 or more and 6.0 or less, b represents a number of 3.5 or more and 4.8 or less, and c represents a number of 0.1 or more and 3.0 or less, wherein the proportion of the crystal phase having an argyrodite-type crystal structure relative to all crystal phases constituting the solid electrolyte is 97 wt % or more, and the compound has a lattice strain of less than 0.10%.

DETAILED DESCRIPTION

Hereinafter, the present invention will be described based on a preferred embodiment thereof. The solid electrolyte according to the present invention contains a compound that is represented by $Li_aPS_bX_c$, where X is at least one elemental halogen, a represents a number of 3.0 or more and 6.0 or less, b represents a number of 3.5 or more and 4.8 or less, and c represents a number of 0.1 or more and 3.0 or less. The compound has a crystal phase with an argyrodite-type crystal structure. The compound at room temperature (25° C.) is solid and has lithium ion conductivity. Hereinafter, the compound may also be referred to as "compound A" for the sake of convenience.

The compound A in the present invention is a crystalline material that has a crystal phase with an argyrodite-type crystal structure. However, the compound A may also contain a glass component, or in other words, an amorphous component. The expression "the compound A has a crystal phase with an argyrodite-type crystal structure" means that it is sufficient that the compound A has at least a crystal phase with an argyrodite-type crystal structure, and the compound A may have a crystal phase that is different from the crystal phase with an argyrodite-type crystal structure (also referred to as "heterogeneous phase"). Of course, the compound A may not contain the heterogeneous phase.

As used herein, the term "a crystal phase with an argyrodite-type structure" refers to a crystal phase of a family of compounds derived from a mineral represented by the chemical formula: $Ag_8GeS_6$. In view of improving lithium ion conductivity, the compound having a crystal phase with an argyrodite-type crystal structure particularly preferably has a crystal structure that belongs to the cubic crystal system.

Whether or not the solid electrolyte of the present invention contains the compound having a crystal phase with an argyrodite-type structure can be determined by, for example, XRD analysis. Specifically, in an X-ray diffraction pattern obtained through analysis using an X-ray diffractometer that uses CuKα1 rays, the crystal phase with an argyrodite-type structure has characteristic peaks at 2θ=15.34°±1.00°, 17.74°±1.00°, 25.19°±1.00°, 29.62°±1.00°, 30.97°±1.00°, 44.37°±1.00°, 47.22°±1.00°, and 51.70°±1.00°. Furthermore, the crystal phase with an argyrodite-type crystal structure also has characteristic peaks at, for example, 2θ=54.26°±1.00°, 58.35°±1.00°, 60.72°±1.00°, 61.50°±1.00°, 70.46°±1.00°, and 72.61°±1.00°. The term "peak" as used herein means the highest point of a peak. Each peak is preferably present independently without overlapping other peaks.

The crystal phase with an argyrodite-type crystal structure constituting the compound A in the solid electrolyte according to the present invention preferably serves as the primary phase among all crystal phases. As used herein, the term "primary phase" refers to the crystal phase that has the highest abundance ratio, in terms of the number of moles, among all crystal phases in the solid electrolyte according to the present invention. The solid electrolyte according to the present invention may consist of a crystal phase with an argyrodite-type crystal structure, or may also contain a material of a heterogeneous phase that is different from the crystal phase with an argyrodite-type crystal structure as long as the advantageous effects of the present invention are not impaired. Examples of the material of the heterogeneous phase include lithium halide and $Li_3PS_4$.

As described above, the solid electrolyte according to the present invention contains the compound A, which is a compound having a crystal phase with an argyrodite-type crystal structure, and the solid electrolyte may also have a heterogeneous phase that is different from the crystal phase with an argyrodite-type crystal structure. A feature of the solid electrolyte according to the present invention is that the argyrodite rate is controlled in the solid electrolyte. As used herein, the term "argyrodite rate" refers to the mass percentage (wt %) of a crystal phase with an argyrodite-type structure relative to all crystal phases constituting the solid electrolyte according to the present invention. In addition, another feature of the solid electrolyte according to the present invention is that the lattice strain of the compound A contained in the solid electrolyte is controlled.

Specifically, the argyrodite rate of the solid electrolyte according to the present invention is controlled to a high value, and the lattice strain of the compound A is controlled to a small value. These improve the lithium ion conductivity of the solid electrolyte according to the present invention. The inventors of the present invention consider that the reason for this is as follows.

The solid electrolyte according to the present invention contains the compound A. It was considered that the lithium ion conductivity of the solid electrolyte that contains the compound A increases as the abundance ratio of the crystal phase with an argyrodite-type crystal structure is increased. However, it was not possible to control the argyrodite rate of such a solid electrolyte to a high value. In contrast, the inventors of the present invention have found that the argyrodite rate of the solid electrolyte can be controlled to a high value by producing the solid electrolyte using a method described below. Furthermore, the inventors of the present invention have also found that the lithium ion conductivity of the solid electrolyte can be further increased by not only increasing the argyrodite rate in the solid electrolyte, but also controlling the lattice strain of the compound A to a small value. A small lattice strain means that atoms are present at appropriate positions in the crystal structure of the compound A. It is considered that, as a result of this, lithium ions smoothly migrate in the compound A to improve the lithium ion conductivity of the solid electrolyte.

In view of more significantly exhibiting the advantageous effects described above, the proportion of the crystal phase with an argyrodite-type crystal structure relative to all crystal phases constituting the solid electrolyte (hereinafter also referred to simply as "argyrodite rate") is preferably, for example, 97.0 wt % or more, more preferably 97.2 wt % or more, and even more preferably 97.4 wt % or more. The higher the argyrodite rate is, the more preferable it is. Ideally, the argyrodite rate is 100 wt %. The upper limit of the argyrodite rate that can be achieved by the state of the art is about 98.6 wt %, and when the argyrodite rate is as high as that level, the lithium ion conductivity of the solid electrolyte can be sufficiently increased.

From the same viewpoint as described above, the lattice strain of the compound A contained in the solid electrolyte is preferably less than 0.10%, more preferably 0.09% or less, and even more preferably 0.08% or less, in the solid electrolyte according to the present invention. The smaller the lattice strain of the compound A is, the more preferable it is, in view of improving the lithium ion conductivity of the solid electrolyte. The lower limit of the lattice strain that can be achieved by the state of the art is about 0.04%. By further reducing the lattice strain of the compound A, the lithium ion conductivity of the solid electrolyte can be sufficiently increased.

A specific method for determining the argyrodite rate in the present invention will be described in detail in Examples given later. Also, the lattice strain of the compound A contained in the solid electrolyte according to the present invention can be determined by X-ray diffractometry. A specific method thereof will be described in detail in Examples given later.

The solid electrolyte according to the present invention has a lithium ion conductivity at room temperature (25° C.) as high as preferably 4.0 mS/cm or more, more preferably 4.5 mS/cm or more, even more preferably 4.8 mS/cm or more, and even much more preferably 6.0 mS/cm or more, due to the controlled argyrodite rate and the controlled lattice strain of the compound A in the solid electrolyte. The lithium ion conductivity of the solid electrolyte can be measured using the method described in Examples given later.

As described above, the compound A contained in the solid electrolyte according to the present invention is represented by $Li_aPS_bX_c$. As used herein, the expression "the compound A is represented by $Li_aPS_bX_c$" encompasses a compound A that is prepared from starting materials so as to satisfy $Li_aPS_bX_c$. In the compositional formula, the subscript "a", which represents the molar ratio of elemental lithium (Li), is preferably, for example, a number of 3.0 or more and 6.0 or less, more preferably a number of 3.2 or more and 5.8 or less, and even more preferably a number of 3.4 or more and 5.4 or less. The subscript "a" may be a number less than 5.4.

In the compositional formula, the subscript "b", which represents the molar ratio of elemental sulfur (S), is preferably, for example, a number of 3.5 or more and 4.8 or less, more preferably a number of 3.8 or more and 4.6 or less, and even more preferably a number of 4.0 or more and 4.4 or less. The subscript "b" may be a number less than 4.4.

In the compositional formula, the subscript "c" is preferably, for example, a number of 0.1 or more and 3.0 or less, more preferably a number of 0.2 or more and 2.5 or less, and even more preferably 0.4 or more and 2.0 or less. When a, b, and c are within the above-described respective ranges, the compound A exhibits a sufficiently high lithium ion conductivity. In the compositional formula, X represents at least one elemental halogen. In the case where X is a single kind of element, the compound A may be represented by $Li_aPS_bF_c$, $Li_aPS_bCl_c$, $Li_aPS_bBr_c$, or $Li_aPS_bI_c$, for example. In the case where X is composed of two kinds of element, the compound A is represented by $Li_aPS_bX^1_yX^2_z$, where $X^1$ and $X^2$ represent different elemental halogens, and y and z represent numbers that are greater than 0 and satisfy c=y+z. Examples of the combination of $X^1$ and $X^2$ include a combination of Cl and Br, a combination of Cl and I, and a combination of Br and I. In the case where X is composed of three kinds of element, the compound A is represented by $Li_aPS_bX^1_yX^2_zX^3_v$, where $X^1$, $X^2$, and $X^3$ represent different elemental halogens, and y, z, and v represent numbers that are greater than 0 and satisfy c=y+z+v. An example of the combination of $X^1$, $X^2$, and $X^3$ is a combination of Cl, Br, and I. The solid electrolyte according to the present invention may contain a single kind of compound A or two or more kinds of compound A.

In the present invention, the compound A obtained by using starting materials in amounts for satisfying $Li_aPS_bX_c$ may contain an element other than elemental lithium (Li), elemental phosphorus (P), elemental sulfur (S), or elemental halogen (X). For example, the elemental lithium (Li) may be partially replaced by another elemental alkali metal, the elemental phosphorus (P) may be partially replaced by another elemental pnictogen, or the elemental sulfur (S) may be partially replaced by another elemental chalcogen.

The solid electrolyte according to the present invention may contain, for example, impurities in addition to the compound A. In view of small influence on the performance, the amount of impurities contained in the solid electrolyte may be, for example, less than 5 mol %, preferably less than 3 mol %, and more preferably less than 1 mol %.

In the case where the solid electrolyte according to the present invention contains only a single kind of compound A, the compound A preferably has a lattice strain within the above-described range. On the other hand, in the case where the solid electrolyte according to the present invention contains two or more kinds of compounds A, at least one compound as the compound A preferably has a lattice strain within the above-described range, and preferably, all compounds as the compound A each have a lattice strain within the above-described range.

In view of suppressing an increase in the viscosity of a slurry when preparing the slurry, the solid electrolyte according to the present invention preferably has a BET specific surface area of 12 $m^2/g$ or less, more preferably 10 $m^2/g$ or less, and even more preferably 8 $m^2/g$ or less. The smaller the BET specific surface area is, the more preferable it is, in view of suppressing the increase in the viscosity of the slurry when preparing it. However, when the BET specific surface area is too small, the lithium ion conductivity may decrease due to less contact points. Accordingly, the BET specific surface area is preferably set to 1.0 $m^2/g$ or more, more preferably 1.5 $m^2/g$ or more, and even more preferably 2.0 $m^2/g$. Such a BET specific surface area can be sufficiently suppress the reduction in the lithium ion conductivity due to less contact points, and is also effective in suppressing the increase in the viscosity of the slurry when preparing it. The BET specific surface area within the above-described range can be achieved by controlling, for example, the particle size of the solid electrolyte. The method for measuring the BET specific surface area will be described in detail in Examples given later.

The solid electrolyte according to the present invention is in the form of a powder, which is a mass of particles. For example, the particle size of the solid electrolyte according to the present invention is preferably 0.8 μm or more, more preferably 0.9 μm or more, and even more preferably 1.0 μm or more, in terms of 50th percentile volume-weighted particle size, $D_{50}$, as determined by laser diffraction scattering particle size distribution analysis. For example, the volume-weighted particle size $D_{50}$ is preferably 15.0 μm or less, more preferably 10.0 μm or less, and even more preferably 7.0 μm or less. When the volume-weighted particle size $D_{50}$ of the solid electrolyte according to the present invention falls within the upper limit as described above, the solid electrolyte according to the present invention can advantageously easily fit into the interstices between particles of another solid electrolyte in a case where the solid electrolyte according to the present invention is used in combination with the other solid electrolyte. As a result, the number of contact points between solid electrolyte particles and the contact area therebetween increase, and thus the lithium ion conductivity can be effectively improved. On the other hand, when the volume-weighted particle size $D_{50}$ of the solid electrolyte according to the present invention falls within the lower limit as described above, an excessive increase in the lattice strain of the compound A is suppressed. In addition, it is possible to suppress an increase in the overall surface area of the solid electrolyte powder and thus to avoid the problems of an increase in resistance as well as difficulties with mixing with an active material.

In relation to the $D_{50}$ described above, the solid electrolyte according to the present invention preferably has a 10th percentile volume-weighted particle size, $D_{10}$, of 5.0 μm or less, more preferably 3.5 μm or less, and even more preferably 2.0 μm or less, as determined by laser diffraction scattering particle size distribution analysis. For example, the volume-weighted particle size $D_{10}$ is preferably 0.2 μm or more, more preferably 0.3 μm or more, and even more preferably 0.4 μm or more.

The solid electrolyte according to the present invention preferably has a 95th percentile volume-weighted particle size, $D_{95}$, of 40 μm or less, more preferably, 30 μm or less, and even more preferably 20 μm or less, as determined by laser diffraction scattering particle size distribution analysis. For example, the volume-weighted particle size $D_{95}$ is preferably 1.5 μm or more, more preferably 2.0 μm or more, and even more preferably 2.5 μm or more.

When the volume-weighted particle sizes $D_{10}$ and/or $D_{95}$ fall within the above-described respective ranges, the lattice strain of the compound A contained in the solid electrolyte can be a sufficiently small value, and an increase in the overall surface area of the solid electrolyte powder can be suppressed, whereby the lithium ion conductivity of the solid electrolyte can be more sufficiently increased.

The solid electrolyte according to the present invention can be produced preferably using the method described below. A lithium source compound, a phosphorus source compound, a sulfur source compound, and a halogen source compound can be used as starting materials. As the lithium source compound, lithium sulfide ($Li_2S$) can be used, for example. As the phosphorus source compound, phosphorus pentasulfide ($P_2S_5$) can be used, for example. When a sulfide is used as the lithium source compound and/or the phosphorus source compound, the sulfide can also serve as the sulfur source compound. As the halogen source compound, lithium halide can be used. These starting materials are mixed at a predetermined molar ratio between elemental lithium, elemental phosphorus, elemental sulfur, and elemental halogen. Then, the mixture of the starting materials is calcined under an inert atmosphere or under an atmosphere that contains hydrogen sulfide gas to thereby obtain the compound A represented by $Li_aPS_bX_c$ and having a crystal phase with an argyrodite-type structure. For example, a method for increasing the argyrodite rate may include increasing the reactivity between the starting materials during calcination, and specific examples thereof include: a method in which a lithium source compound, a phosphorus source compound, a sulfur source compound, and a halogen source compound used as the starting materials are pulverized into a desired particle size; a method in which the starting materials are uniformly mixed; and a method in which the starting materials are calcined for a long period of time. The atmosphere that contains hydrogen sulfide gas may be 100% hydrogen sulfide gas or a mixed gas of hydrogen sulfide gas and an inert gas such as argon. The calcination temperature is preferably 350° C. or more and 550° C. or less, for example. The duration of keeping this calcination temperature is preferably 0.5 hours or more and 20 hours or less, for example.

By the method described above, a solid electrolyte that contains the compound A is obtained. At this time, the compound A contained in the solid electrolyte has a high crystallinity and a low lattice strain; however, since the solid electrolyte does not have a desired particle size yet, it is necessary to adjust the particle size. To this end, it is necessary to pulverize the solid electrolyte, but the pulverization may cause a lattice strain in the compound A. As a result of studies conducted by the inventors of the present invention, it has been found that it is advantageous for addressing the above to pulverize the solid electrolyte under a condition that the lattice strain is not increased.

The pulverization can be performed using either a wet method or a dry method. For preventing an increase in the lattice strain, it is desirable that the pulverization energy during pulverization should be small. Specifically, the weight and/or the number of dispersing media may be reduced, or the circumferential velocity and/or the pulverization time may be reduced. However, the method for preventing an increase in the lattice strain is not limited to these methods. Various types of media mills can be used in the pulverization. Examples of the media mill include a ball mill, a bead mill, a paint shaker, and a homogenizer. As dispersing media used in the medium mill, balls or beads made of ceramic such as alumina or zirconia can be used. The diameter of the dispersing media can be, for example, 0.1 mm or more and 50 mm or less.

In the case where the pulverization is performed using a wet method, it is preferable to use an organic solvent as a medium for dispersion in view of suppressing the generation of hydrogen sulfide, which is caused by a reaction of the solid electrolyte with water. Examples of the organic solvent include: aromatic organic solvents such as toluene, xylene, benzene, and solvent naphtha; and aliphatic organic solvents such as heptane, decane, normal hexane, cyclohexane, and mineral spirit. These organic solvents may be used singly or in a combination of two or more thereof.

A slurry is prepared by mixing the organic solvent and the solid electrolyte described above, and the slurry is subjected to wet pulverization. For example, the concentration of the solid electrolyte contained in the slurry is preferably 5 mass % or more and 50 mass % or less in view of preventing an increase in the lattice strain of the compound A to easily obtain a solid electrolyte with a high lithium ion conductivity. In the wet pulverization using a media mill, the amount of the dispersing media used is preferably 5 parts by mass or more and 50 parts by mass or less per 100 parts by mass of the slurry in view of preventing an increase in the lattice strain of the compound A. In general, the duration of dispersion using a media mill is preferably 0.5 hours or more and 60 hours or less in view of preventing an increase in the lattice strain of the compound A.

In the case where the wet pulverization is performed, the degree of pulverization is preferably controlled such that the solid electrolyte that has undergone the wet pulverization preferably has a volume-weighted particle size $D_{50}$ of 0.8 µm or more, more preferably 0.9 µm or more, and even more preferably 1.0 µm or more, so as to not increase the lattice strain, in view of increasing the lithium ion conductivity of the solid electrolyte.

The solid electrolyte according to the present invention obtained in the manner described above can be used as, for example, a material for a solid electrolyte layer, or a material to be contained in an electrode material mixture containing an active material. Specifically, the solid electrolyte according to the present invention can be used as a positive electrode material mixture for a positive electrode layer containing a positive electrode active material or a negative electrode material mixture for a negative electrode layer containing a negative electrode active material. Accordingly, the solid electrolyte according to the present invention can be used in a battery that includes a solid electrolyte layer, a so-called solid-state battery. More specifically, the solid electrolyte according to the present invention can be used in a lithium solid-state battery. The lithium solid-state battery may be a primary battery or a secondary battery. However, the solid electrolyte according to the present invention is particularly preferably used in a lithium secondary battery. As used herein, the term "solid-state battery" encompasses a solid-state battery that does not contain any liquid material or any gel material as the electrolyte, and also encompasses a solid-state battery that contains a liquid material or a gel material as the electrolyte in an amount of, for example, 50 mass % or less, 30 mass % or less, or 10 mass % or less.

A solid electrolyte layer in a solid-state battery can be produced using, for example, any of the following methods: a method including dripping onto a substrate a slurry containing the solid electrolyte according to the present invention, a binder, and a solvent, and spreading the slurry using a doctor blade or the like; a method including bringing the slurry into contact with a substrate and then cutting it using an air knife; a method including forming a coating film using a screen printing method or the like, and heat drying the coating film to remove the solvent. Alternatively, the solid electrolyte layer may also be produced by press-forming the powder of the solid electrolyte according to the present invention and then processing the press-formed solid electrolyte as appropriate. The solid electrolyte layer may contain another solid electrolyte in addition to the solid electrolyte according to the present invention. The solid electrolyte layer of the present invention typically has a thickness of preferably 5 µm or more and 300 µm or less, and more preferably 10 µm or more and 100 µm or less.

In view of increasing the lithium ion conductivity, the solid electrolyte layer containing the solid electrolyte according to the present invention preferably has a porosity of 50% or less, more preferably 30% or less, and even more preferably 20% or less. The porosity of the solid electrolyte layer can be adjusted by, for example, adjusting the pressure when the powder of the solid electrolyte according to the present invention is pressed into a powder compact. The pressure is preferably 20 MPa or more, for example.

The porosity can be calculated using the following mathematical relation from the true density and the apparent density of the solid electrolyte layer obtained using, for example, a liquid phase method (Archimedes method).

Porosity (%)=(True Density−Apparent Density)/True Density×100

A mixture of the solid electrolyte according to the present invention with another solid electrolyte can also be used for the solid electrolyte layer. When mixing the solid electrolyte according to the present invention with another solid electrolyte, the solid electrolyte according to the present invention can be used in combination with, for example, any of an amorphous material (glass), glass ceramic, and a crystalline material. For the case where a sulfide solid electrolyte is used as the other solid electrolyte to be mixed with the solid electrolyte according to the present invention, specific examples of the sulfide solid electrolyte include $Li_2S$—$P_2S_5$ system, $Li_4P_2S_6$, and $Li_7P_3S_{11}$. Also, the other solid electrolyte to be combined with the solid electrolyte according to the present invention may be a non-sulfide such as an oxide solid electrolyte.

A solid-state battery includes a positive electrode layer, a negative electrode layer, and a solid electrolyte layer provided between the positive electrode layer and the negative electrode layer, and the solid electrolyte layer preferably contains the solid electrolyte according to the present invention. The shape of the solid-state battery may be, for example, laminate, cylindrical, or rectangular.

In the solid-state battery containing the solid electrolyte according to the present invention, the positive electrode material mixture contains a positive electrode active material. As the positive electrode active material, a positive electrode active material used for a lithium secondary battery can be used as appropriate, for example. Examples of the positive electrode active material include a spinel lithium transition metal compound, and a lithium metal oxide with a layered structure. The positive electrode material mixture may contain, in addition to the positive electrode active material, other materials such as a conductive assistant material.

In the solid-state battery containing the solid electrolyte according to the present invention, the negative electrode material mixture contains a negative electrode active material. As the negative electrode active material, a negative electrode active material for a lithium secondary battery can be used as appropriate, for example. Examples of the negative electrode active material include lithium metal, carbon materials such as artificial graphite, natural graphite and non-graphitizable carbon (hard carbon), lithium titanate, titanium niobium composite oxide, silicon, silicon compounds, tin, and tin compounds. The negative electrode material mixture may contain, in addition to the negative electrode active material, other materials such as a conductive assistant material.

EXAMPLES

Hereinafter, the present invention will be described in further detail by way of examples. However, the scope of the present invention is not limited to the examples given below.

Example 1

$Li_2S$ powder, $P_2S_5$ powder, LiCl powder, and LiBr powder were weighed so as to satisfy a composition of $Li_{5.4}PS_{4.4}Cl_{0.8}Br_{0.8}$. These powders were pulverized and mixed using a ball mill to obtain a powder mixture. The powder mixture was calcined to obtain a lithium ion conductive sulfide as a calcined product. The calcination was performed using a tubular electric furnace. During the calcination, a hydrogen sulfide gas with a purity of 100% was allowed to flow at 1.0 L/min in the electric furnace. The calcination was performed at 450° C. for 4 hours. As a result of XRD analysis, it was confirmed that the calcined product had a crystal phase with an argyrodite-type structure and a composition of $LiCl_{0.5}Br_{0.5}$.

The calcined product was roughly crushed using a mortar and a pestle, and thereafter crushed using a hammer crusher to obtain a crushed product. The crushed product was mixed with a solvent to obtain a slurry with a concentration of 12 mass %. The slurry was placed in a bead mill (with zirconia beads having a diameter of 0.2 mm) and subjected to wet pulverization. The solvent used in the slurry was toluene. After the wet pulverization, the slurry was subjected to solid-liquid separation, and the solid was dried. The calcined product after drying was sieved using a sieve with a mesh size of 53 μm, to thereby obtain the intended solid electrolyte.

Example 2

A solid electrolyte was obtained in the same manner as in Example 1, except that the calcination temperature, the pulverizer, the slurry concentration, and the media diameter were changed as shown in Table 1 given below.

Example 3

A solid electrolyte was obtained in the same manner as in Example 1, except that the calcination temperature and the slurry concentration were changed as shown in Table 1 given below.

Example 4

A solid electrolyte was obtained in the same manner as in Example 1, except that the calcination temperature, the pulverizer, the slurry concentration, and the media diameter were changed as shown in Table 1 given below.

Comparative Example 1

A solid electrolyte was obtained in the same manner as in Example 1, except that the calcination temperature, the slurry concentration, and the media diameter were changed as shown in Table 1 given below.

Comparative Example 2

A solid electrolyte was obtained in the same manner as in Example 1, except that the slurry concentration and the media diameter were changed as shown in Table 1 given below.

Evaluation 1

For each of the solid electrolytes obtained in Examples and Comparative Examples, the argyrodite rate was determined using the method described below. Also, the lattice strain of $Li_{5.4}PS_{4.4}Cl_{0.8}Br_{0.8}$ was determined. Furthermore, the $D_{10}$, $D_{50}$, and $D_{95}$ of the solid electrolyte were determined. The results are shown in Table 1 given below.

Determination of Argyrodite Rate

Determination was performed using Smart Lab available from Rigaku Corporation. An optical system for focusing method was used. A Johansson monochromator was used on the incident side, and D/teX Ultra 250 was used as a detector. Soller slits with an angle of 5 deg were used as incident and receiving parallel slits. A non-air exposure holder was used. Settings were made as follows. Scan axis: 2θ/θ, scan range: 20 deg to 140 deg, step width: 0.01 deg, and scan speed: maximum peak height of 10000 counts or more.

Also, SRM 660a (compound name: $LaB_6$) available from NIST (National Institute of Standards and Technology) was subjected to determination under the same conditions, and used as a width standard.

Analysis was performed using PDXL 2 available from Rigaku Corporation. The method for analysis was as follows. First, identification was performed. CIF files (Crystallographic Information Files) described below were read to identify substances. The CIF files were acquired from ICSD (inorganic crystal structure database). For the compound A, a CIF file with ICSD Collection Code 418490 was used. For the heterogeneous phase, e.g., for lithium halide, a CIF file with ICSD Collection Code 53818 was used, and identification was performed using appropriate CIF files until there was no unidentified peak.

Next, intensity decomposition was performed using WPPF. For width correction, a width standard data file was selected. This file is a file obtained by obtaining XRD data determined on SRM 660a to identify it as $LaB_6$, analyzing the data in the same manner as the analysis method described below, and storing the data. A quantitative values were obtained from the result of analysis and the argyrodite rate was calculated.

Analysis Method

The peak angle and the peak width were corrected using an external standard sample. Split Pearson VII function was used as a model function for the peak shape. Next, "Intensity Decomposition" was selected from the "Basic" tab through "Refinement Parameter Settings"-"Method". Also, in the case where lithium halide is contained as a heterogeneous phase, the lattice constant varies according to the state of halogenation, and thus the initial value of the lattice constant of lithium halide was adjusted such that the XRD data and the calculated value were located at substantially the same position. Next, refinement was performed. In the refinement, various parameters were adjusted to reach sufficient convergence. For example, the approximate target of S value was 1.5 or less.

Measurement of Lithium Ion Conductivity

The solid electrolyte was subjected to uniaxial press-molding in a glove box purged with a sufficiently dried Ar gas (dew point: −60° C. or less). Furthermore, the resultant was molded at 200 MPa using a cold isostatic pressing apparatus to obtain a pellet with a diameter of 10 mm and a thickness of about 4 mm to 5 mm. A carbon paste for electrodes was applied to the upper and lower sides of the pellet, and then the resultant was heated at 180° C. for 30 minutes to obtain a sample for ion conductivity measurement. The lithium ion conductivity of the sample was measured using Solartron 1255B available from Toyo Corporation. The measurement was performed at a temperature of 25° C. and a frequency of 0.1 Hz to 1 MHz using an alternate-current impedance method, while the molded sample was secured at 6 Ncm.

TABLE 1

| | Calcination temperature (° C.) | Pulverization apparatus | Slurry concentration (wt %) | Media diameter (mm) | Argyrodite rate (wt %) | Lattice strain (%) | $D_{10}$ (μm) | $D_{50}$ (μm) | $D_{95}$ (μm) | Specific surface area ($m^2 g^{-1}$) | Lithium ion conductivity (mS/cm) |
|---|---|---|---|---|---|---|---|---|---|---|---|
| Example 1 | 450 | Bead mill | 12 | 0.2 | 97.6 | 0.07 | 0.96 | 2.08 | 4.49 | 6.3 | 6.0 |
| Example 2 | 490 | Ball mill | 25 | 10 | 97.9 | 0.05 | 1.19 | 2.76 | 7.16 | 3.1 | 7.2 |
| Example 3 | 490 | Bead mill | 10 | 0.2 | 97.4 | 0.08 | 0.52 | 1.34 | 6.39 | 7.4 | 4.8 |
| Example 4 | 450 | Ball mill | 25 | 10 | 98.6 | 0.04 | 1.59 | 6.26 | 17.40 | 2.7 | 6.5 |
| Comp. Ex. 1 | 430 | Bead mill | 15 | 0.3 | 95.3 | 0.17 | 0.42 | 0.73 | 2.12 | 13.2 | 3.4 |
| Comp. Ex. 2 | 450 | Bead mill | 15 | 0.3 | 97.2 | 0.18 | 0.38 | 0.65 | 2.39 | 13.5 | 3.7 |

Determination of Lattice Strain

Determination and analysis were performed in the same manner as described in Determination of Argyrodite Rate, and the lattice strain was calculated from the result of analysis.

Determination of $D_{10}$, $D_{50}$, and $D_{95}$

By using a sample delivery controller for laser diffraction particle size distribution analyzer ("Microtrac SDC" available from Microtrac BEL Corporation), a sample (powder) was introduced into an organic solvent, and the resulting mixture at a flow rate of 50% was irradiated with ultrasonic wave of 30 W for 60 seconds a plurality of times. Thereafter, the particle size distribution was determined using a laser diffraction particle size distribution analyzer "MT 3000 II" available from Microtrac BEL Corporation, and $D_{10}$, $D_{50}$ and $D_{95}$ were determined from the obtained volume-weighed particle size distribution chart. As the organic solvent, toluene was used.

Evaluation 2

For each of the solid electrolytes obtained in Examples and Comparative Examples, the BET specific surface area and the lithium ion conductivity were determined using the methods described below. The results are shown in Table 1 given below.

Measurement of BET Specific Surface Area

A sample (powder) was heated in vacuo at 120° C. for 1 hour using a pretreatment apparatus "BELPREP VAC II" available from Microtrac BEL Corporation. After that, using a specific surface area analyzer "BELSORP MINI II" available from Microtrac BEL Corporation, the specific surface area was obtained by calculating from the amount of nitrogen gas adsorbed at liquid nitrogen temperature (77 K) using a BET (Brunauer Emmett Teller) method.

As can be clearly seen from the results shown in Table 1, the solid electrolytes obtained in Examples exhibited a higher lithium ion conductivity than the solid electrolytes obtained in Comparative Examples.

INDUSTRIAL APPLICABILITY

According to the present invention, a solid electrolyte with a high lithium ion conductivity is provided.

The invention claimed is:

1. A solid electrolyte comprising:
a compound that comprises a crystal phase having an argyrodite-type crystal structure and that is represented by $Li_a PS_b X_c$, where X is at least one elemental halogen, a represents a number of 3.0 or more and 6.0 or less, b represents a number of 3.5 or more and 4.8 or less, and c represents a number of 0.1 or more and 3.0 or less,
wherein the proportion of the crystal phase having an argyrodite-type crystal structure relative to all crystal phases constituting the solid electrolyte is 97 wt % or more, and
the compound has a lattice strain of 0.04% or more and less than 0.10%.

2. The solid electrolyte according to claim 1, wherein the solid electrolyte exhibits a lithium ion conductivity of 4.0 mS/cm or more.

3. An electrode material mixture comprising:
the solid electrolyte according to claim 1; and
an active material.

4. A solid electrolyte layer comprising the solid electrolyte according to claim 1.

5. A solid-state battery comprising the solid electrolyte according to claim 1.

\* \* \* \* \*